United States Patent [19]

Cordy et al.

[11] Patent Number: 5,074,051
[45] Date of Patent: Dec. 24, 1991

[54] INSTRUMENT FOR MEASURING THE DISTANCE OF A FLANGE TO A HOLE

[75] Inventors: Dennis M. Cordy, Renton; Charles E. Lee, Seattle; Mark C. Maier, Renton; Richard R. Trujillo, Seattle, all of Wash.

[73] Assignee: The Boeing Company, Seattle, Wash.

[21] Appl. No.: 555,869

[22] Filed: Jul. 20, 1990

[51] Int. Cl.$^5$ ............................................. G01B 21/00
[52] U.S. Cl. ........................................ 33/520; 33/644; 33/797
[58] Field of Search ................. 33/520, 644, 792–794, 33/797–808, 501.4, 501.5, 558.01, 558.4

[56] References Cited

U.S. PATENT DOCUMENTS

| | | | |
|---|---|---|---|
| 1,199,155 | 9/1916 | Burriss | 33/797 |
| 2,693,033 | 11/1954 | Acker et al. | 33/520 |
| 2,780,874 | 2/1957 | Puckett | 33/520 |
| 3,289,446 | 12/1966 | Davey | 72/36 |
| 3,762,057 | 10/1973 | Kaifesh | 33/794 |
| 3,962,792 | 6/1976 | Stepanek et al. | 33/143 L |
| 4,231,158 | 11/1980 | Possati | 33/149 |
| 4,477,978 | 10/1984 | Azuma | 33/520 |
| 4,586,261 | 5/1986 | Beaupére | 33/803 |
| 4,612,656 | 9/1986 | Suzuki et al. | 377/24 |
| 4,731,931 | 3/1988 | Goodman et al. | 33/520 |
| 4,798,004 | 1/1989 | Suzuki | 33/793 |

FOREIGN PATENT DOCUMENTS

| | | | |
|---|---|---|---|
| 902262 | 8/1945 | France | 33/783 |
| 57-72005 | 5/1982 | Japan | 33/783 |
| 84781 | 6/1919 | Switzerland | 33/644 |

Primary Examiner—William A. Cuchlinski, Jr.
Assistant Examiner—Alvin Wirthlin
Attorney, Agent, or Firm—J. Michael Neary; B. A. Donahue

[57] ABSTRACT

A measuring instrument for measuring the distance from a hole, drilled at the intersection of a rib and a stringer, to the adjacent flange of the rib includes two arms projecting laterally out from the side of the instrument and forward to engage the flange. The arms are geared together at their inner ends within the body of the instrument to insure that the angles of both arms relative to the longitudinal axis of the body are equal to each other so that the longitudinal axis of the instrument in use remains perpendicular to the face of the flange. A spring loaded conical hole-centering probe protruding from the bottom face of the instrument fits into and centers itself in the hole and establishes a reference from which the flange is measured. A stylus, slidably mounted in the instrument and protruding from the front end thereof, contacts the face of the flange. A linear measuring gauge measures the position of the stylus in the instrument to provide an accurate measure of the distance of the flange to the hole in a direction perpendicular to the flange.

30 Claims, 8 Drawing Sheets

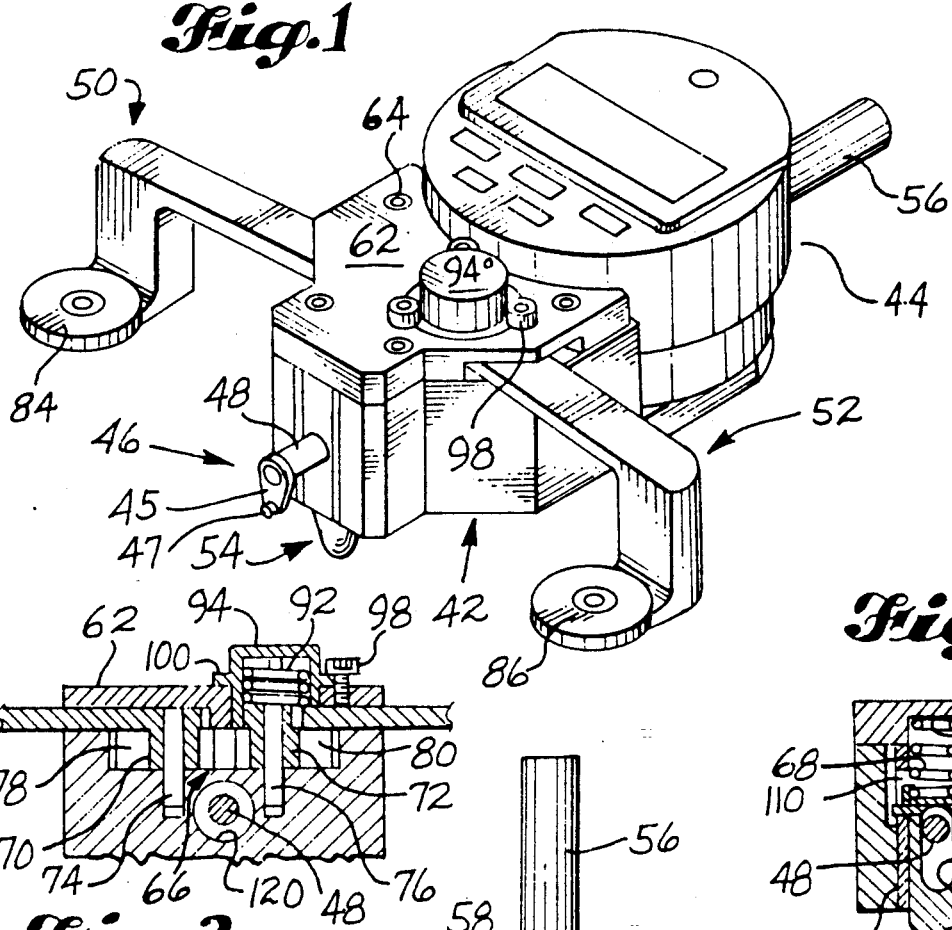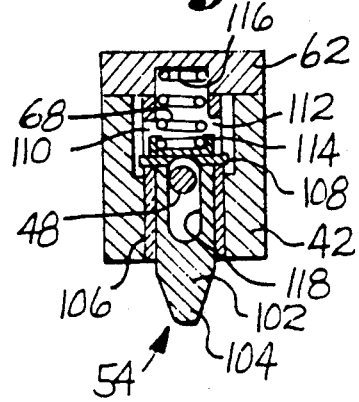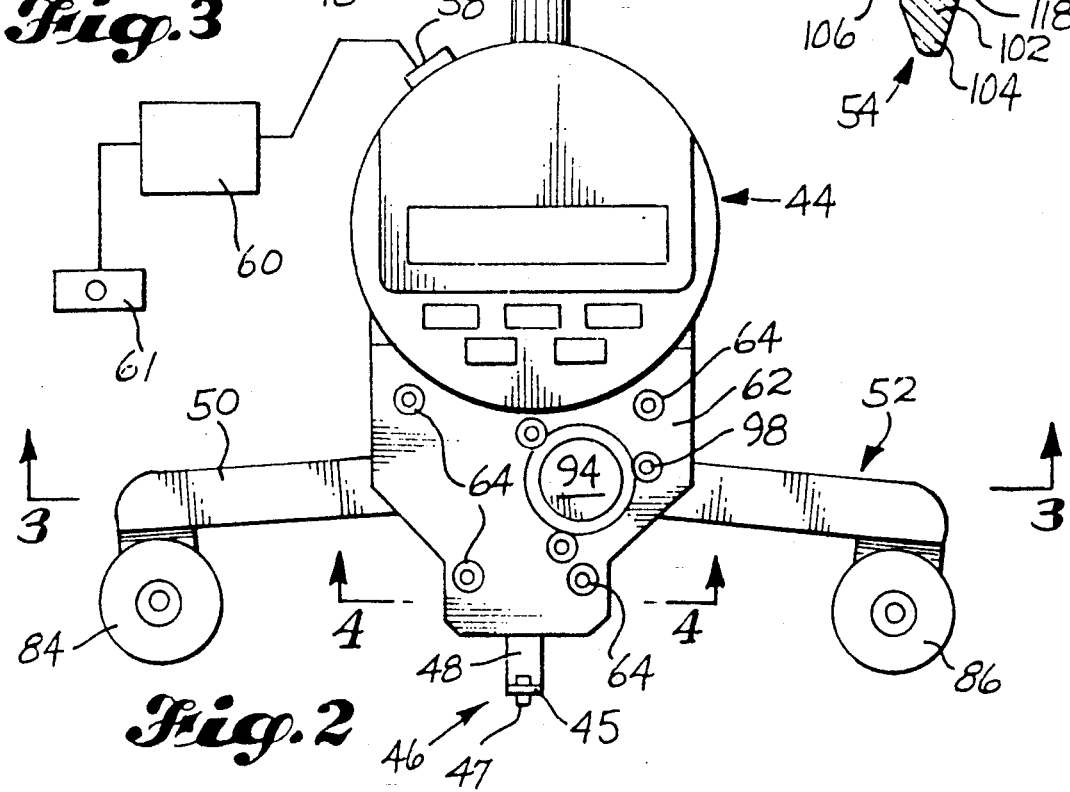

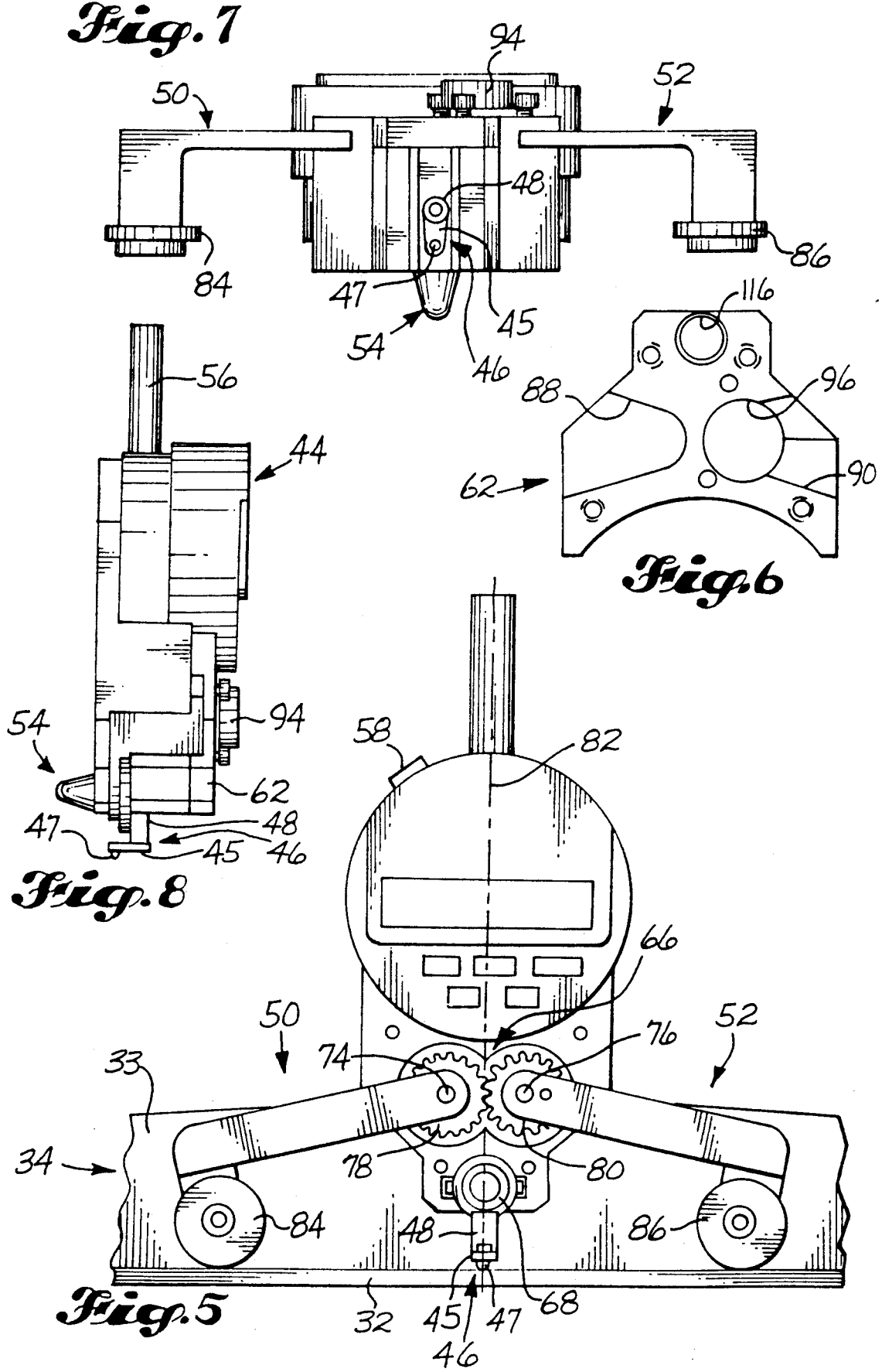

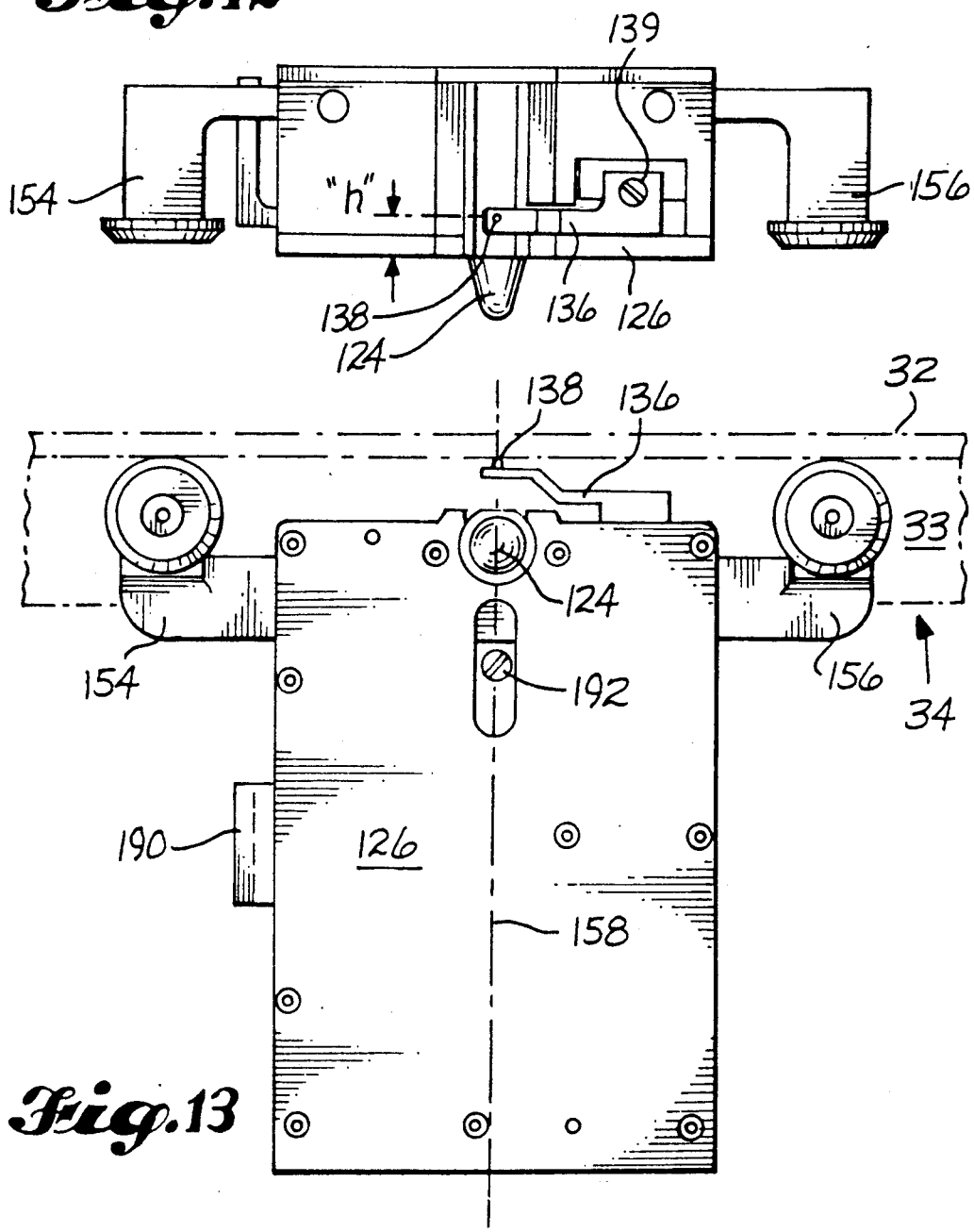
Fig.12
Fig.13
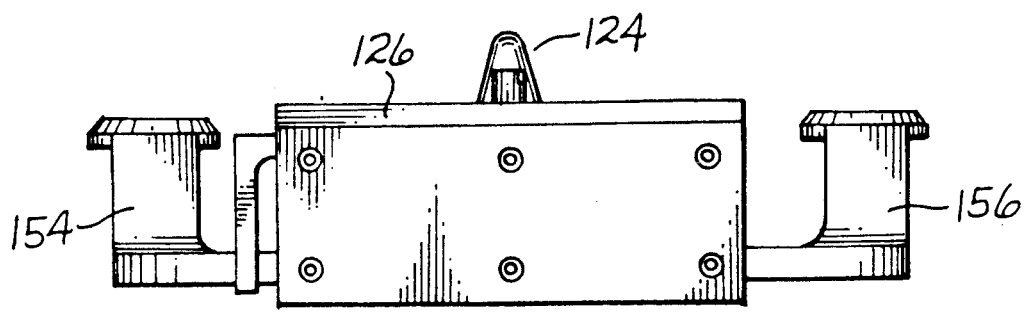
Fig.14

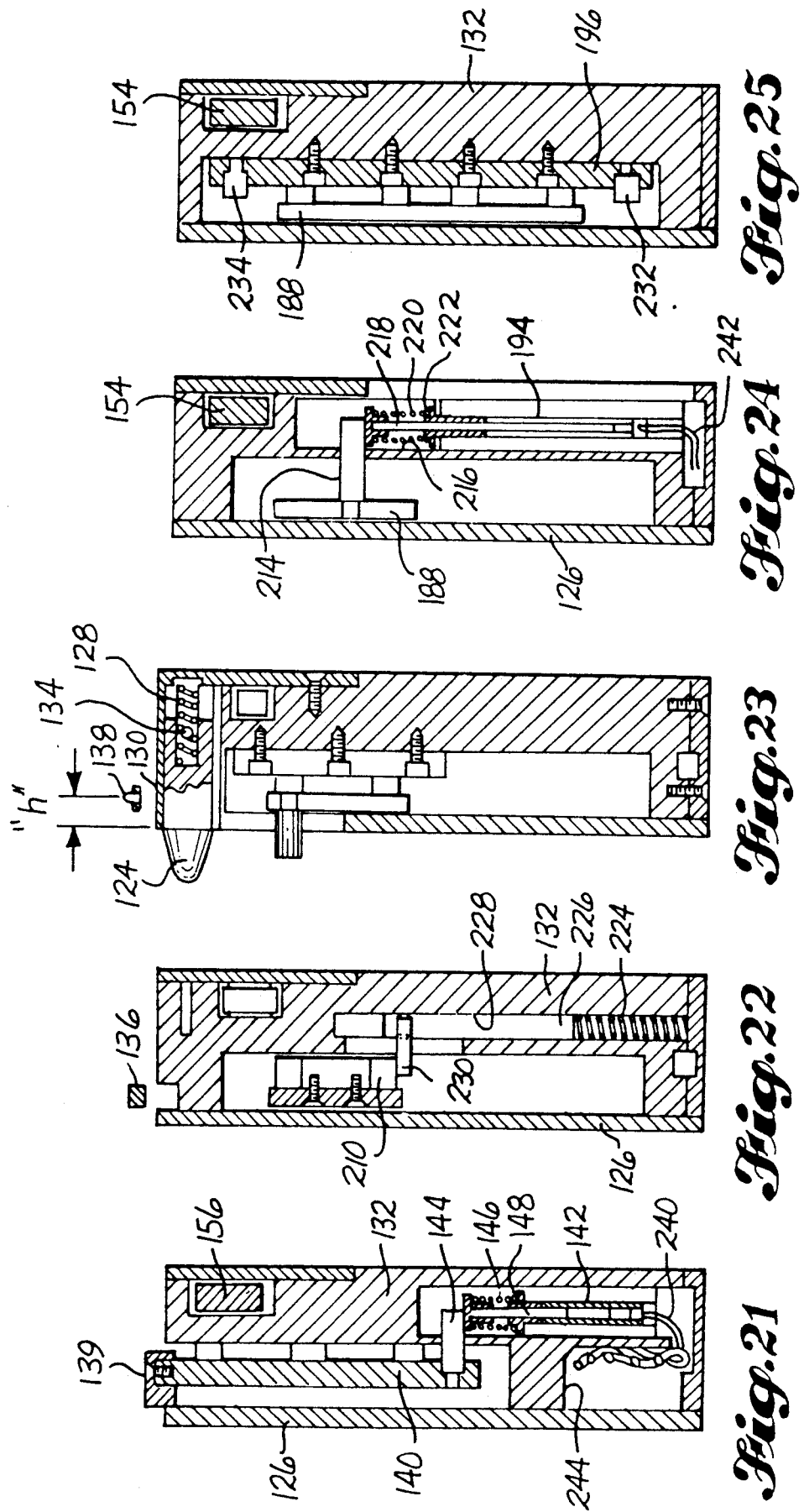

INSTRUMENT FOR MEASURING THE DISTANCE OF A FLANGE TO A HOLE

BACKGROUND OF THE INVENTION

This invention relates to instruments for measuring the distance from a hole to an adjacent flange, and more particularly to an instrument for measuring the distance from a hole, drilled at the intersection of a rib and a stringer, to the adjacent flange of the rib and the adjacent edge of the stringer flange to insure that the hole is drilled at the correct position so that a fastener, to be positioned in the hole for fastening the rib and stringer together, is correctly positioned.

In airplanes, as in many other mechanical systems, the fastening of two crossing L-shaped or Z-shaped structural elements is done by drilling a hole through the overlapping portions of the two elements, and securing them together with a fastener such as a rivet or a threaded fastener inserted in the hole. For optimum strength, the hole should be properly placed relative to the flanges of the structural elements to provide the maximum strength and appropriate clearance of the fastener head from the flange.

Quality control procedures to insure that the hole is properly located have included putty and steel scales which have poor accuracy, and "go, no-go" devices which indicate whether the holes are in tolerance, but give no indication how far in or out of tolerance the holes are. Also, transfer devices have been used which are satisfactory in some cases but are less accurate and more cumbersome and slower to use.

Modern quality control procedures include statistical process control which make it possible to track the position of the hole in a succession of parts, even when they are within tolerance, so that corrections can be made when it becomes apparent that the position of the hole is drifting toward an out of tolerance position. In this way, it is possible to initiate a correction before an actual out of tolerance condition occurs. However, in order for a statistical process control system to be possible, it is necessary to acquire accurate information as to the actual position of the hole in a succession of parts, as opposed to simple information as to whether the hole is within or out of tolerance. With those accurate hole locations, the statistical process control calculations and plots can be made and quality control corrections can be initiated to insure that expensive corrections for out of tolerance holes are unnecessary.

SUMMARY OF THE INVENTION

Accordingly, it is an object of this invention to provide an instrument which accurately measures the position of a hole relative to an adjacent flange. Another object of the invention is to provide an instrument which conveniently and quickly measures the shortest distance from the centerline of the hole to an adjacent flange and automatically records that measurement for subsequent statistical analysis in quality control procedures. It is a further object of this invention to provide an instrument which measures the distance from a hole to an adjacent flange and also measures the distance from that hole to the edge of the other structural element to which the flanged element is to be attached.

These and other objects of the invention are attained in an instrument having a pair of arms projecting laterally out from the side of the instrument and forward to engage the flange. The arms are coupled at their inner ends within the body of the instrument to insure that the angle of both arms relative to the longitudinal axis of the body are equal to each other so that the longitudinal axis of the instrument in use remains perpendicular to the face of the flange. A hole-centering probe in the bottom of the instrument fits into the hole and establishes a reference from which the flange is measured. A stylus is slidably mounted and protrudes from the front of the instrument for contacting the face of the flange and measuring the distance from the hole-centering probe to the flange to provide an accurate measure of the distance of the flange to the hole in a perpendicular direction.

A second embodiment of the invention utilizes a pin slidably mounted in the body for measuring the distance from the edge of the structural member to which the flanged member is to be attached. In the second embodiment, the hole centering probe remains the reference position for both the front mounted stylus and the bottom mounted pin so that an accurate measure of the two distances can be obtained from a single instrument.

DESCRIPTION OF THE DRAWINGS

The many objects and advantages of the invention will become more apparent upon reading the following description of the preferred embodiment in conjunction with the following drawings wherein:

FIG. 1 is a perspective view of a first embodiment of a measuring instrument made in accordance with the invention;

FIG. 2 is a plan view of the instrument shown in FIG. 1;

FIG. 3 is a sectional elevation on lines 3—3 in FIG. 2;

FIG. 4 is a sectional elevation along lines 4—4 in FIG. 2;

FIG. 5 is a plan view of the instrument shown in FIG. 2 with the cover plate removed and with the instrument in use measuring the distance from a hole to the flange;

FIG. 6 is a plan view of the underside of the cover plate removed from the instrument shown in FIG. 5;

FIG. 7 is a front elevation of the instrument shown in FIG. 1;

FIG. 8 is a side elevation of the instrument shown in FIG. 1;

FIG. 12 is a front elevation of the instrument shown in FIG. 9;

FIG. 13 is a bottom plan view of the instrument shown in FIG. 9;

FIG. 14 is a rear elevation of the instrument shown in FIG. 9;

FIG. 21 is a sectional elevation along lines 21—21 in FIG. 18;

FIG. 22 is a sectional elevation along lines 22—22 in FIG. 18;

FIG. 23 is a sectional elevation along lines 23—23 in FIG. 18;

FIG. 24 is a sectional elevation along lines 24—24 in FIG. 18;

FIG. 25 is a sectional elevation along lines 25—25 in FIG. 18;

DESCRIPTION OF THE PREFERRED EMBODIMENTS

Figure 11:
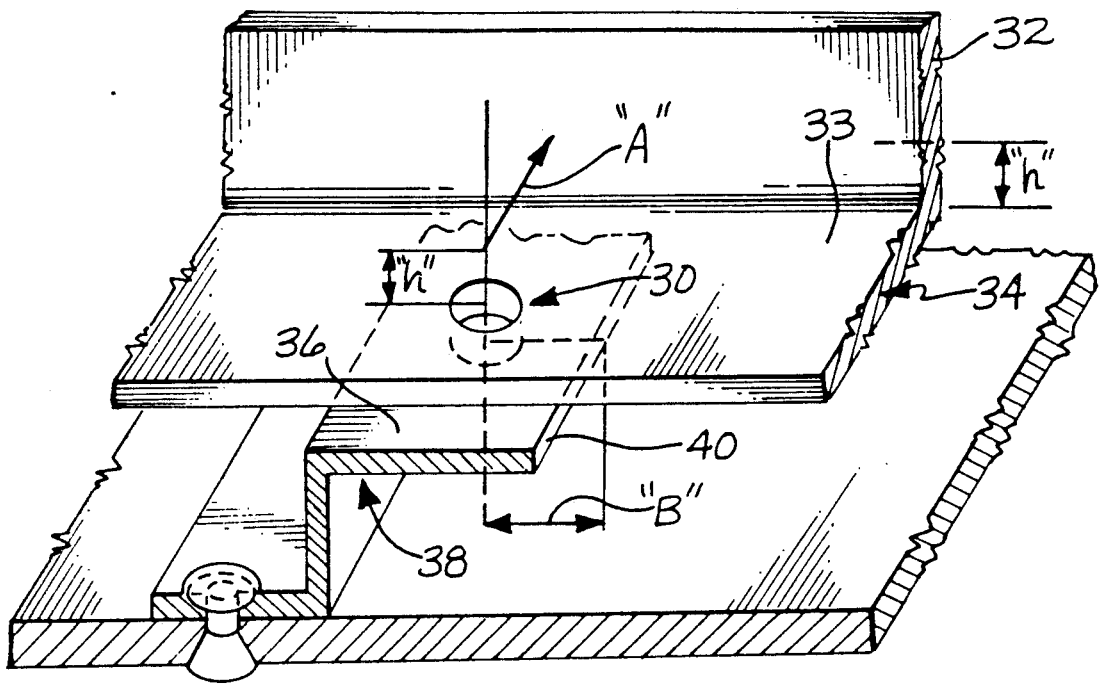
FIG. 11 is a perspective view of a rib and stringer, having a hole drilled at the overlapping portions for receiving a fastener, and showing the "A" and "B" dimensions to be measured by the instruments of this invention.

Turning now to the drawings wherein like reference characters designate identical or corresponding parts, and more particularly to FIG. 1 thereof, a measuring instrument is shown for measuring the distance "A", shown in FIG. 11, between the centerline of a hole 30, drilled in one leg 33 of an L shaped rib 34, to a flange 32 of the rib. A representative rib 34 and a stringer 38, to which the rib 34 is to be fastened by a fastener through the hole 30, are shown in FIG. 11. The leg 33 of the rib 34, and a flange 36 of the stringer 38 lie flat against each other, and the hole 30 is drilled through the overlapping portions of the leg 32 and the flange 36. The instruments of this invention are to measure the position of the hole 30 in relation to the rib flange 32 and the edge of the stringer flange 36.

The instrument shown in FIG. 1 includes a body 42 on which a conventional linear measuring gauge 44 is mounted. The measuring gauge used in this embodiment is a Mitutoyo Series 543-180 digital dial indicator having a forward probe slidably mounted in the gauge, and a rack in the probe engaged with a pinion which is optically coded to enable the gauge to indicate the longitudinal position of the probe. The gauge has an electrical system for converting the optical readout to electrical form. Other linear measurement gauges could be used instead of the Mitutoyo.

A contact stylus 46 having a contact nubbin 47 projecting forwardly from an offset leaf 45 is connected to an extension rod 48, which in turn is connected to the forward probe of the linear measuring gauge, for contacting the flange 32 of the L shaped rib 34. The forward probe of the linear measuring gauge is spring biased forward so the contact stylus 46 and the extension rod 48 is normally at it's fully forward extension, and retracts rearward into the instrument when pressed against the flange 32 of the rib 34 during the measuring process.

Two arms 50 and 52 are mounted in the body 42 to maintain the axis of the instrument at a 90° angle to the flange 32. A hole centering probe 54 is spring loaded in the body and protrudes from the bottom surface thereof to accurately locate the center line or axis of the hole 30 which is being measured.

Turning now to FIG. 2, the forward probe (not shown) of the measuring gauge 44 is accurately guided within the instrument and has a guided extension bearing 56 projecting from the rear of the gauge. An electrical socket 58 is connected to the side of the gauge 44 for connecting a data recording instrument 60, also known as a data logger, to the measuring gauge 44 for recording the readings from the measuring instrument, when keyed by a trigger device 61, for purposes of statistical analysis and other manufacturing purposes.

A cover plate 62 is fastened to the top of the body 42 forward of the gauge 44 by four screws 64. The cover 62 covers a coupling connection 66 at the inner ends of the arms 50 and 52, shown in FIGS. 3 and 5, and holds a spring 68 which biases the hole centering probe 54 down, as shown in FIG. 4.

The coupling connection 66 of the inner ends of the arms 50 and 52 will now be described. The arms 50 and 52 each have a cylindrical boss 70 and 72, respectively, mounted on the inner ends of the arms, and a hole is drilled in the center of each boss. A pair of pins 74 and 76 are pressed into the holes drilled in the body 42, and the bosses 70 and 72 fit over the pins 74 and 76 for pivoting thereon. A pair of gears 78 and 80 are pressed onto the bosses 70 and 72 respectively and mesh when in place on the pins 74 and 76, as shown most clearly in FIG. 5. The meshing of the gears on the inner ends of the arms 50 and 52 insures that the arms will rotate equally and will maintain an equal angular orientation with the axis 82 of the instrument whenever the pads 84 and 86 on the ends of the arms 50 and 52 are pressed against the flange 32 of the rib 34, as illustrated in FIG. 5.

The cover plate 62 has a pair of recesses 88 and 90, shown in FIG. 6 sized to receive the arms 50 and 52, and accommodate their full angular rotation from the forward extreme position to the rearward extreme position. The forward and rearward edges of the recesses 88 and 90 function as stops for the arms 50 and 52 to limit the travel to an arc of about thirty (30) degrees.

A torsion spring 92 is mounted in a cap 94, as shown in FIG. 3. One end of the cap 94 is mounted in a hole 96 in the cover plate 62 and is held in place by three screws 98 engaging a flange 100 on the cap 94. One end of the torsion spring fits into a hole in the underside of the cap 94, and the other end fits into a hole on the arm 52. The cap is rotated in a clockwise direction in FIG. 2 until sufficient spring force is exerted on the arm 52 to pivot the arms forward against the flange 32, and then the cap is tightened onto the cover 62 by the screws 98 threaded into the cover 62. The arm 52, urged forwardly by the spring 92, also urges the other arm 50 forwardly by virtue of the meshing gears 78 and 80.

The hole centering probe 54, shown most clearly in FIG. 4, includes a stainless steel plunger 102 having a rounded, conical end 104. The plunger 102 is mounted in a cylindrical bearing sleeve 106 made of low friction material such as "Oilite" which accurately guides the plunger 102 for vertical motion in the body 42. The plunger 102 has a pin 108 projecting laterally from both sides of the plunger 102 and extending into a pair of longitudinally extending slots 110 and 112 through the cylindrical sleeve 106 to guide the vertical motion of the plunger 102 and limit its motion vertically to the ends of the slots 110 and 112. The top end of the plunger 102 has a upwardly projecting rim 114 to receive the end of the compression coil spring 68. The top of the spring 68 fits into a cylindrical recess 116 in the underside of the cover 62 and is held in place by the cover 62.

The plunger 102 has an oblong slot 118 lying on the axis 82 of the machine to receive the extension rod 48 to which the stylus 46 is connected. The rod 48 extends through the oblong slot 118 in the plunger 102 and through a corresponding hole in the bearing sleeve 106 and then backward into a hole 120 shown in FIG. 3 drilled into the body 42 in line with the bearing projection 56 of the instrument 44.

In operation, the contact pads 84 and 86 on the ends of the arms 50 and 52 are pressed against the flange 32, shown in FIG. 5, and rotate backwardly against the force of the torsion spring 92. Because of the connection of the gears 78 and 80 on the inner ends of the arms 50 and 52, the arms 50 and 52 rotate backwardly an equal angular translation to maintain the axis 82 of the instrument perpendicular to the flange 32. The stylus 46 is pressed against the flange 32, and the extension rod 48 retracts into the instrument until the hole 30 centering probe 54 slips into the hole in the leg 33 of the rib 34. Because the plunger 102 is spring loaded by the spring 68, the plunger moves outwardly into the hole 30 until the conical end 104 of the plunger 102 fills the hole and thereby accurately locates the center line of the plunger 102 on the center line of the hole 30. The instrument now indicates the distance between the axis of the plunger 102 and the contact nubbin 47 on the front of the stylus 46. The data recorder 60 can now be triggered by the trigger 62 to record the distance being indicated on the gauge 44 by virtue of the electrical connection at the electrical socket 58.

Figure 9:
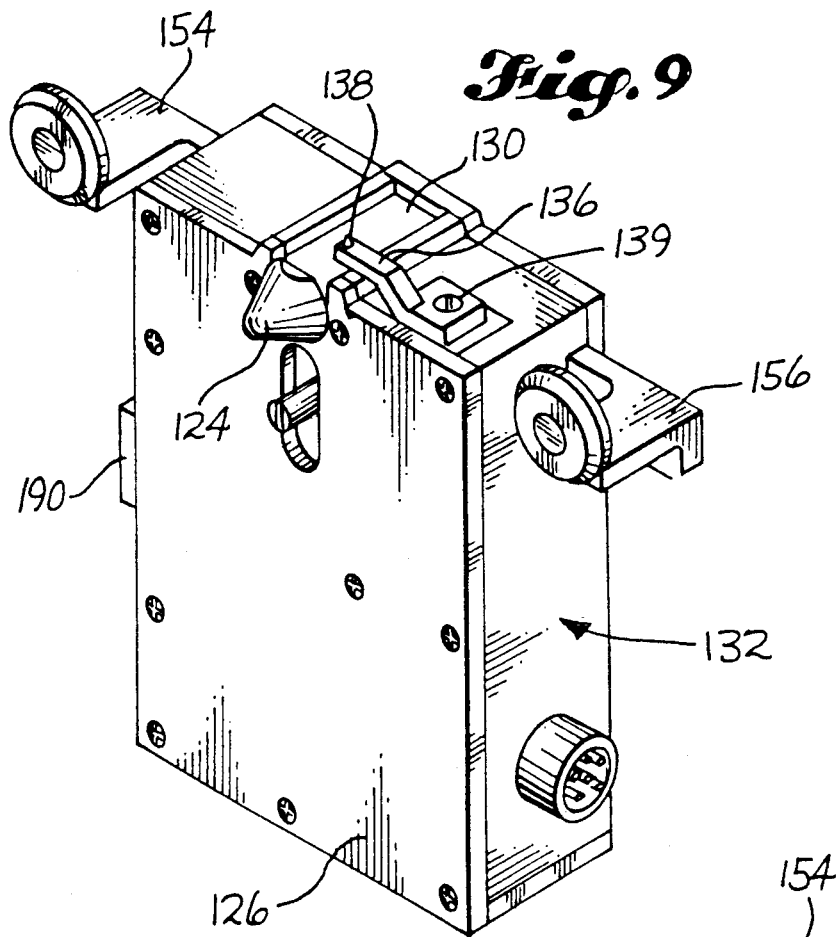
FIG. 9 is a perspective view from the bottom side of a second embodiment of an instrument made in accordance with the invention.
Figure 10:
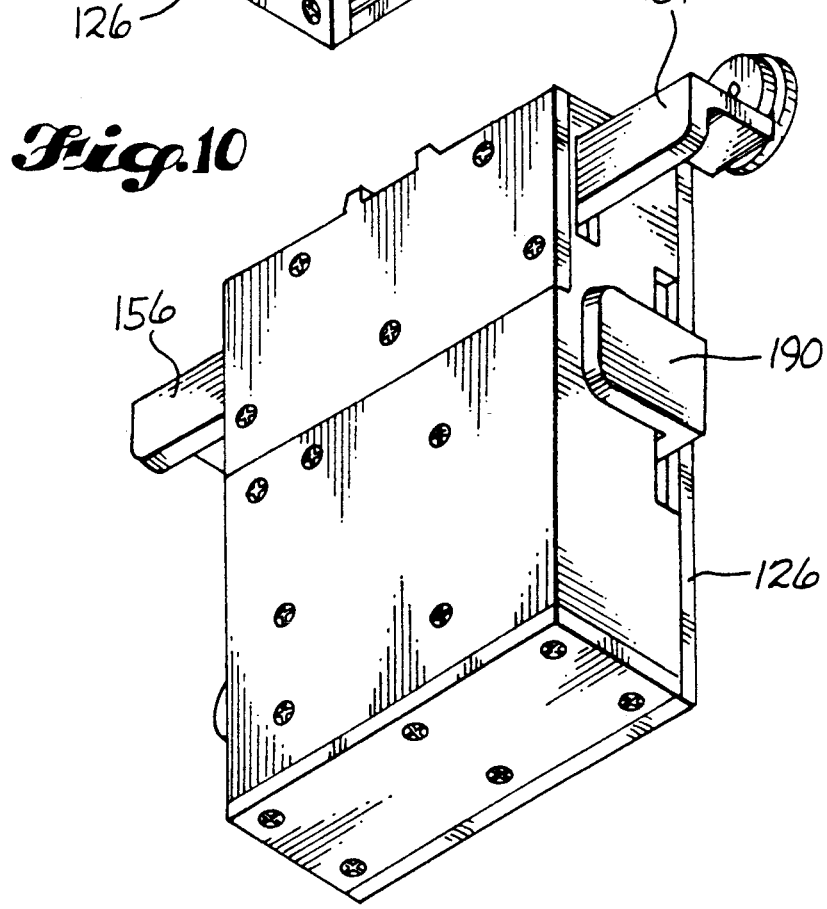
FIG. 10 is a perspective view of the instrument shown in FIG. 9 from the top.

Referring now to the FIGS. 9 and 10, a second embodiment of an instrument according to the invention is shown, for measuring the dimension "A" from the hole 30 to the flange 32 of the rib 34, and also for measuring the dimension "B" from the underside of the same hole 30 to the edge 40 of the stringer flange 36 stringer 38, as illustrated in FIG. 11. The hole 30 must be positioned correctly relative to the rib flange 32 and the edge 40 of the stringer 38 so that a fastener (not shown) which will hold the rib and the stringer together will be positioned correctly for maximum effectiveness. The "A" dimension is taken at a certain height "h" above the top surface of the leg 33 to avoid the inaccuracy that would occur by attempting to measure to the flange 32 at the height of the fillet or curved junction between the leg 33 and flange 32.

The instrument shown in FIGS. 9, 10, 12, 13, 14 and 23 has a conical plunger 124 projecting below a bottom cover plate 126 for insertion into the hole 30. The conical plunger 124 is biased toward its extended position by a spring 128 (shown only in FIG. 23) in an Oilite plunger cylinder 130 mounted in a body 132 of the instrument. The conical plunger 124 fits into the hole 30 to establish the position of the instrument relative to the hole 30, and accurately locates the axis of the conical plunger on the axis of the hole by virtue of the conical end of the plunger 124. When the plunger 124 has filled the end of the hole 30 at the surface of the leg 33, the bottom face of the instrument can be pushed down to lie flat against the leg 33, which will cause the plunger 124 to retract into the plunger cylinder 130 until the bottom cover plate 126 is flat against the surface of the leg 33. A pin 134 extending out from each side of the plunger 124 into a slot in the plunger cylinder prevents the plunger from being pushed too far out of the plunger cylinder 130.

Figure 19:
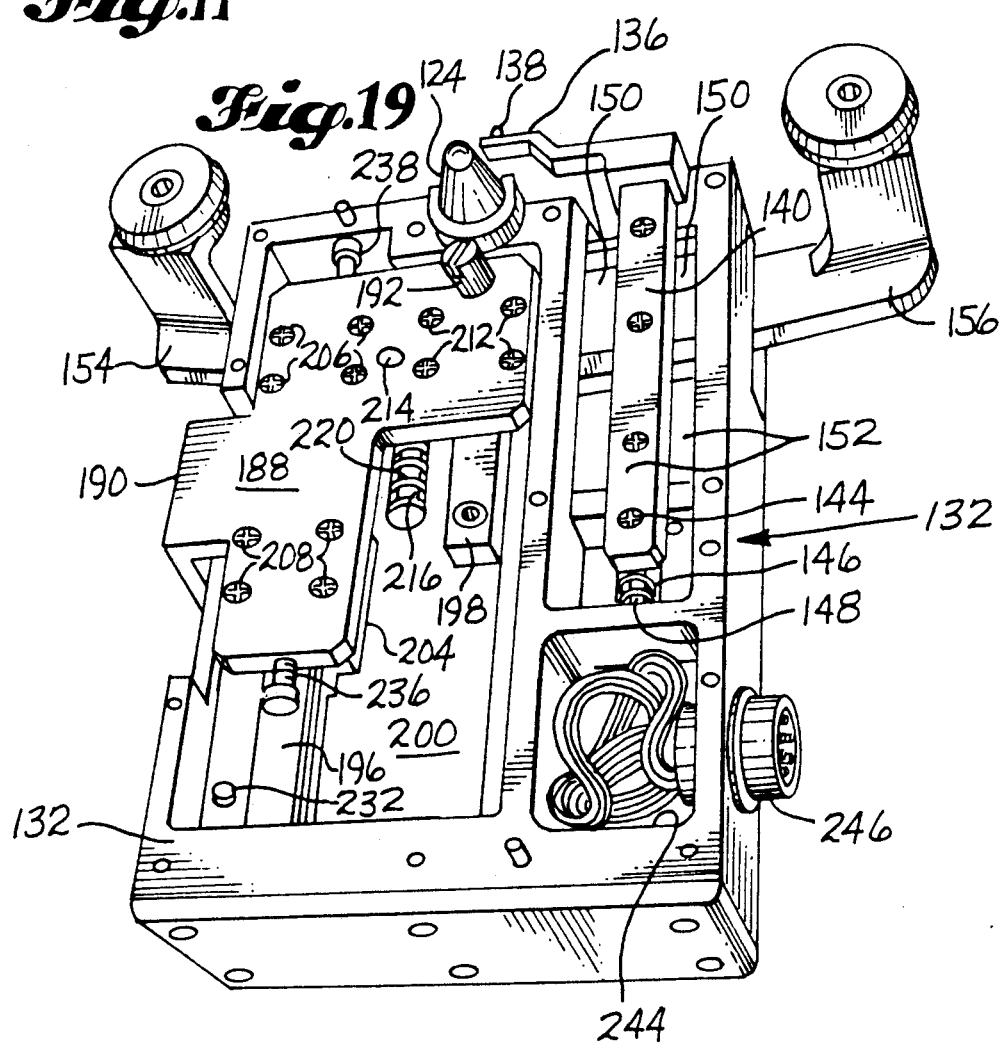
FIG. 19 is a perspective view of the bottom side of the instrument shown in FIG. 18.
Figure 16:
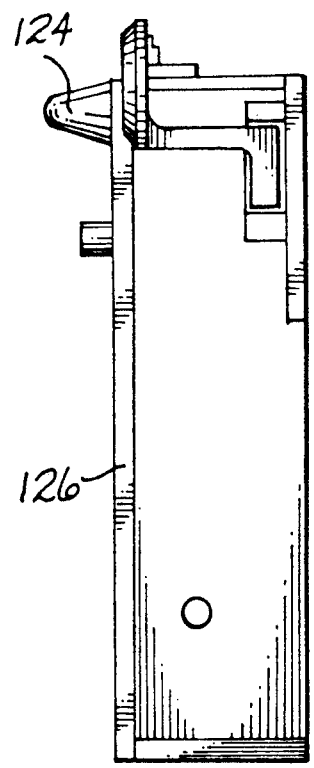
FIG. 16 is a left side elevation of the instrument shown in FIG. 9.
Figure 15:
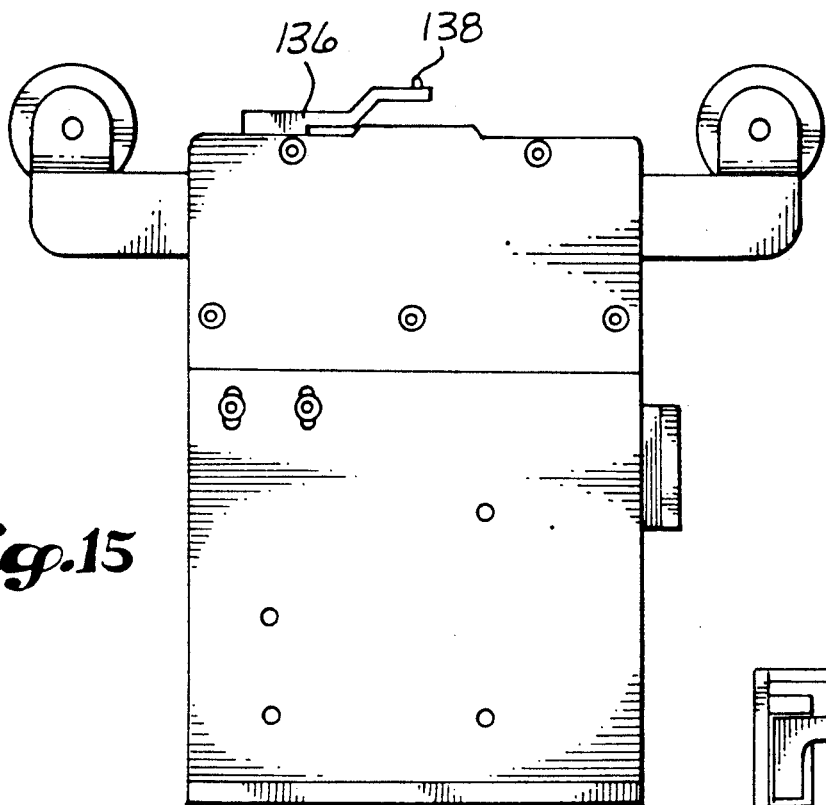
FIG. 15 is a top plan view of the instrument shown in FIG. 9.
Figure 17:
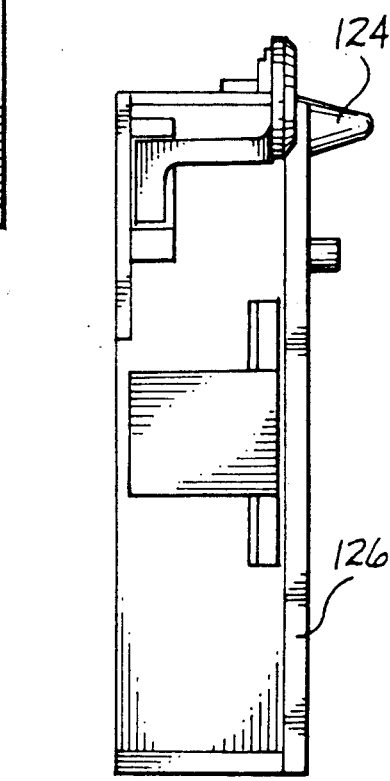
FIG. 17 is a right side elevation of the instrument shown in FIG. 9.
Figure 18:
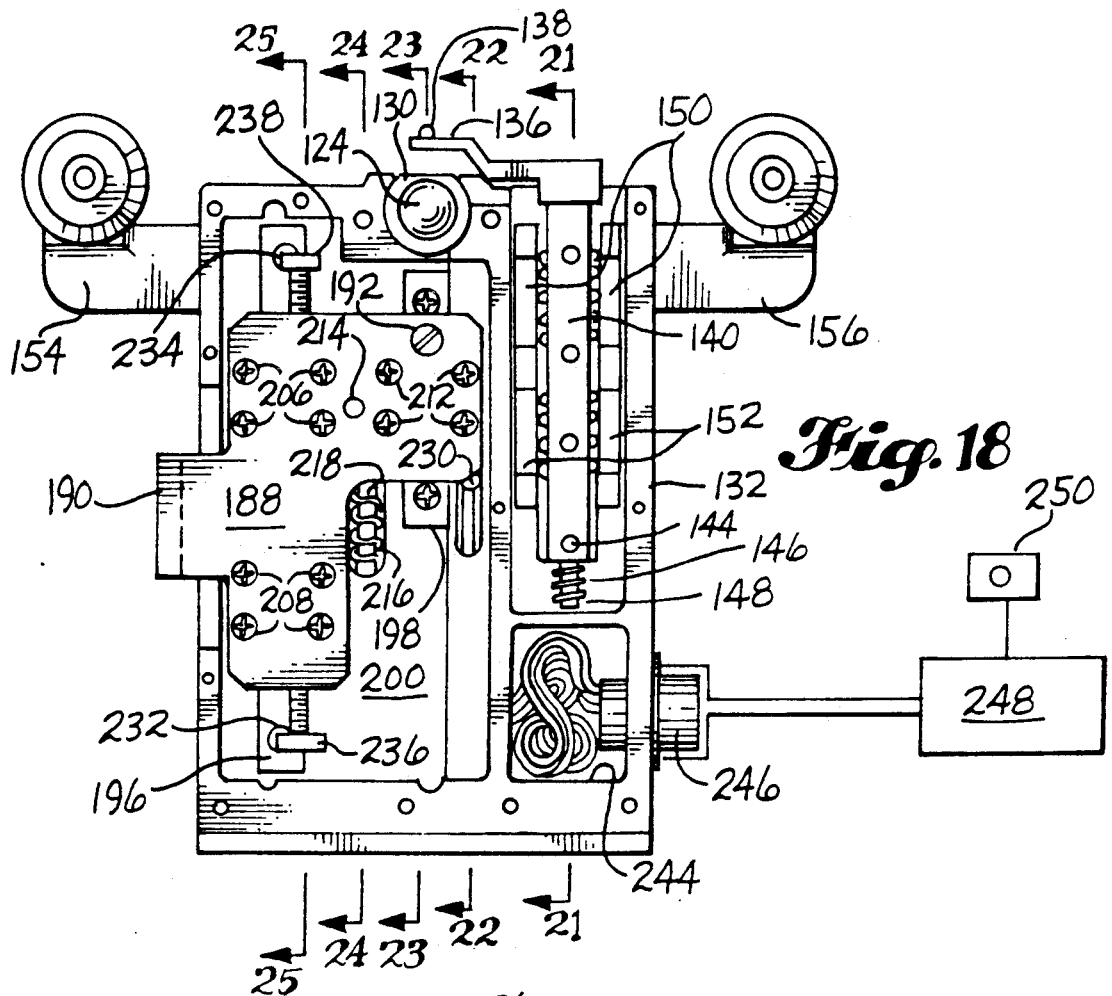
FIG. 18 is a bottom plan view of the instrument shown in FIG. 13 with the cover plate removed.

A stylus 136 having a contact nubbin 138 at the end of the stylus 136 is secured on by a screw 139 to a bar 140 mounted for precision sliding within the body 132, as shown in FIGS. 18, 19 and 21. The bar 140 is spring loaded so that it is normally at its full extension out in front of the body 132. The measurement from the hole 30 to the flange 32 of the rib 34 is made by measuring the distance between the center line of the plunger 124 to the point of contact between the nubbin 138 and the flange 32. That measurement is taken by an LVDT 142, as shown in FIG. 21, pushed by retraction of the bar 140 through a pin 144 which is connected to the rear end of the bar 140. A return spring 146 disposed about a rod 148 of the LVDT provides the forward force that holds the bar 140 and the stylus 136 in the forward-most position. Two pairs of linear bearings 150 and 152 as shown in FIG. 18 support the bar 140 for smooth and precise linear motion in the forward and rearward direction and prevent any lateral motion of the bar 140 within an accuracy of about 0.002".

The stylus 136 and the conical plunger 124 are used to measure the "n A" dimension shown in FIG. 11. The measurement is taken by pushing the stylus 136 of the instrument against the flange 32 of the rib 34 to retract the stylus 136 and insert the conical plunger 124 into the hole 30. A pair of arms 154 and 156 maintain the perpendicular orientation of the longitudinal axis 158 of the instrument, as shown in FIG. 13 relative to the plane of the flange 32 so that the measurement is taken at exactly 90° between the centerline of the hole 30 and the flange 32. The height of the contact nubbin 138 on the stylus 136 relative to the plane of the bottom cover plate 126 is precisely set at the height "h" above the plane of the surface of the leg 33 so that the measurement is taken at the correct height "h" above the surface. This relationship is shown in FIGS. 11 and 12, wherein the height "h" is shown between the bottom face of the bottom cover plate 126 and the position of the nubbin 138 on the stylus 136.

Figure 20:
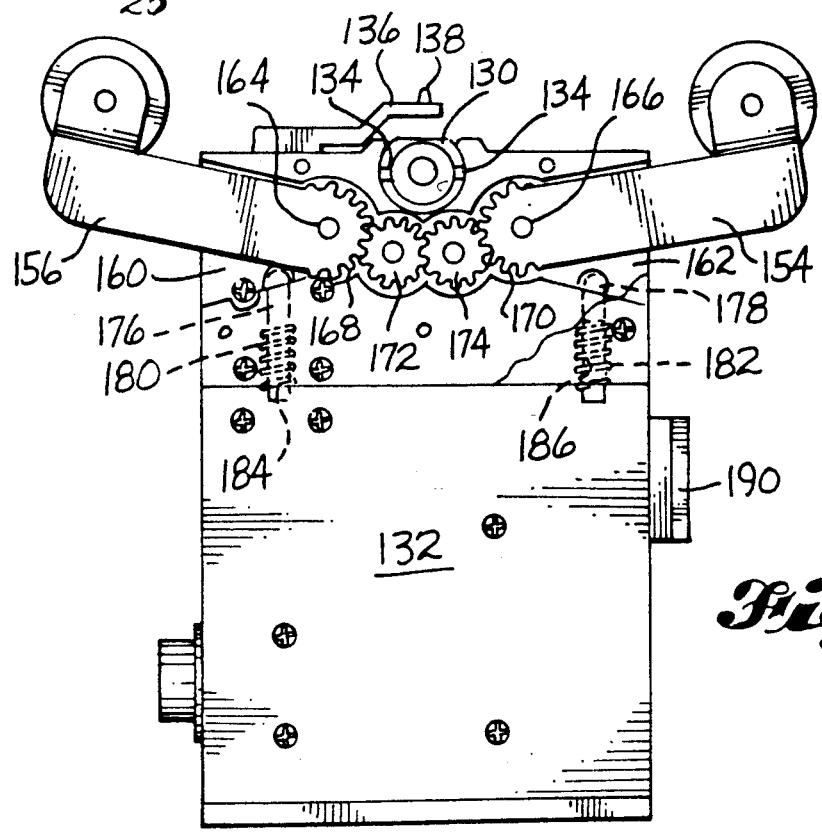
FIG. 20 is a perspective view, from the top, of the instrument shown in FIG. 15.

The two arms 154 and 156, which insure the axis of the instrument is held at 90° to the face of the flange, pivot in a pair of recesses 160 and 162 in the body 132, as shown in FIG. 20. The walls of the angular recesses 160 and 162 define the forward and rearward limits of the pivotal rotation of the arms 154 and 156 about their pivot points. The pivots are dowel pins 164 and 166 pressed into holes drilled in the body 132 for holding the arms 154 and 156 in place. The inner ends of the arms 154 and 156 are formed in gear teeth 168 and 170 which mesh with gears 172 and 174 which themselves mesh to insure that the angle of each of the two arms remains equal to each other within the limits of play provided by the gears. The arms 154 and 156 are biased forward by two plungers 176 and 178 urged forwardly by coil springs 180 and 182 held in two bores 184 and 186 in the body 132.

The "B" dimension, as shown in FIG. 11 between the edge 40 of the stringer 38 and the centerline of the hole 30, is meshed by the instrument by inverting it from the position in which it measures the "A" dimension and placing the conical plunger 124 into the underside of the hole 30 while pulling a plate 188, shown in FIG. 18 to the rear using a handle 190, and allowing a pin 192 fastened to the plate 188 to engage the edge 40 of the stringer flange 36. The measurement is taken by a second LVDT 194, shown in FIG. 24 when the pin 192 is engaging the edge 40 of the stringer flange 36 and the plunger 124 is in the underside of the hole 30. The plate 188 is mounted on a pair of slides 196 and 198, shown in FIG. 19, mounted in a pocket 200 in the body 132. Two pairs of linear bearings, the left hand pair of which is (hidden by the plate 188, and one of the right hand pair 204 of which is shown partially in FIG. 19 are mounted to the plate 188 by screws 206 and 208, and engage the edges of the slide 196 to insure accurate linear motion of the plate 188. Likewise, a pair of linear bearings (hidden by the plate 188 in FIG. 19, but one of which, 210, is shown in FIG. 22) is fastened to the plate 188 by screws 212 for engaging the slide 198 to insure accurate linear motion of the plate 188 forward and rearward in the pocket 200.

The plate 188 moves the LVDT 194 by a pin 214 (only the end of which is shown in FIG. 19, and all of which is shown in FIG. 24) which is screwed into the plate 188 and extends upward into a bore 216 in the body 132. The pin 214 engages the top of a rod 218 of the LVDT 194 for pushing the rod 218 toward the rear when the plate 188 slides to the rear. The movement of the LVDT 194 toward the front when the plate 188 slides forward is powered by a spring 220 coiled about the rod 218 and bearing against a fixed stop 222 in the body 132. A supplemental spring 224 is provided for urging the plate 188 forward. The spring 224 acts against a piston 226 in a bore 228 in which the spring 224 lies. A pin 230 is attached to the piston 226 and bears against the leftmost linear bearing 210 to transfer the force of the spring 224 to the slide 188. A pair of pins 232 and 234, shown in FIGS. 18 and is pressed into the slide 196 to limit the travel of the plate 188. If desired, the travel limit can be made adjustable by a screw 236 on the rear face of the plate 188 and another screw 238 on the forward face of the plate 188.

The LVDTs 142 and 194 are connected by sets of wires 240 and 242 which pass through conduits in the body 132 and are collected in a recess 244 where they connect to a connector 246. In use, the instrument is connected to a data collector 248 through the connector 246 and all of the measurements made by the instrument are recorded by the data collector 248 when triggered by a trigger 250, as shown schematically in FIG. 18.

The invention thus presents an instrument that can accurately measure and transmit for recordal by a datalogger the perpendicular distance from a flange to a hole, and the distance from the edge of a structural member, such as the stringer 38, to a hole along a line perpendicular to the flange of the structural member. It is convenient to us, very quick in making extremely accurate measurements, and easily records the measurements taken for statistical process control. The instruments are highly reproducible in their measurements, and produce very little variation in the measurements as used by different workers.

Obviously, numerous variations and modifications of the preferred embodiments are possible and will occur to persons skilled in the art in view of this disclosure. Therefore, it expressly to be understood that these variations and modifications, and equivalents thereof, are to be considered within the scope of the invention as defined in the following claims, wherein we claim:

What is claimed is:

1. A measuring instrument, having a longitudinal axis, for measuring the distance from a flange to the centerline of a hole in a surface adjacent to said flange, comprising:
    a stylus slidably mounted, for movement parallel to said longitudinal axis, on the front of said instrument and urged forwardly by resilient means;
    a linear measuring device operated by said stylus for measuring the linear displacement of said stylus from a reference position;
    centerline positioning means for positioning said reference position on said centerline of said hole;
    a pair of arms, each having an inner end and an outer end and each extending laterally outward from the sides of said instrument, said arms being movable in a direction having an axial component;
    contact means on the outer end of each arm for contacting said flange;
    coupling means for coupling said arms together at their inner ends and for maintaining an equal distance from said outer end of said arms in an axial direction forward to a reference plane perpendicular to said longitudinal axis to ensure that said axis of said instrument is perpendicular to said flange when said contact means on the outer ends of said arms are in contact with said flange.

2. A measuring instrument as defined in claim 1, wherein:
    said centerline positioning means includes a hole centering probe projecting from a bottom face of said instrument for insertion into said hole and for establishing a reference from which the distance to said flange is measured.

3. A measuring instrument as defined in claim 2, further comprising:
    a bar mounted in said instrument on linear bearings for sliding movement in a direction parallel to said longitudinal axis; and
    means for attaching said stylus to said bar.

4. A measuring instrument as defined in claim 2, wherein:
    said hole centering probe has a vertical axis which is perpendicular to said bottom face of said instrument and intersects said longitudinal axis.

5. A measuring instrument as defined in claim 4, wherein:
    said stylus has a contact nubbin for contacting said flange; and
    said contact nubbin lies in said longitudinal axis.

6. A measuring instrument as defined in claim 2, further comprising:
    a pin projecting from said instrument from the same side thereof as said hole centering probe;
    mounting structure to which said pin is fastened, said mounting structure supported in said instrument for travel therein in a direction parallel to said longitudinal axis;
    a second linear measuring device coupled to said pin for movement therewith for measuring the displacement of said pin from a reference position;
    whereby said instrument measures the distance from said hole to an adjacent edge of a structure in which the hole resides by inserting said hole centering probe in said hole and moving said pin into contact with said edge of said structure, and taking a reading from said second linear measuring device.

7. A measuring instrument as defined in claim 6, further comprising:
    a first pin spring for urging said pin toward said hole centering probe; and
    a handle attached to said pin mounting structure by which said mounting structure may be retracted to facilitate placement of said instrument in position to measure said hole-to-edge distance.

8. A measuring instrument as defined in claim 7, wherein:
    said first pin spring also urges said second linear measuring device toward its reference position.

9. A measuring instrument as defined in claim 6, further comprising:
   a supplemental spring operatively bearing against said pin mounting structure for assisting said first pin spring in moving said pin mounting structure toward its reference position.

10. A measuring instrument as defined in claim 2, wherein said hole centering probe includes:
   a conical plunger, spring loaded in said instrument for vertical sliding movement in a direction perpendicular to said bottom face;
   a bearing sleeve in which said plunger is mounted for vertical sliding motion, said bearing sleeve supporting and guiding said plunger.

11. A measuring instrument for measuring the distance from a surface of a flange to a hole adjacent to the flange, comprising:
   a body having a longitudinal axis defining a forward direction and a rearward direction, said body having a front end and a rear end, two lateral sides, one on each side of said longitudinal axis, a bottom face and a top face;
   a pair of arms, each having an inner end and an outer end, said arms each being pivotally mounted in said body at said inner end, and means for coupling each arm to the other arm for equal angular rotation about its own pivot point;
   means for urging said arms to rotate about their pivot points to rotate said outer ends of said arms in said forward direction;
   a contact stylus mounted in said body and projecting forward of said front end, said stylus having a contact point at its forward end for contacting said flange surface;
   a hole centering probe projecting from said bottom face for insertion into a hole and for centering said probe on the axis of said hole;
   linear measuring means for measuring the linear travel of slidable means mounted in said instrument;
   means for connecting said stylus to said slidable means, for measuring the displacement of said stylus from a reference position;
   whereby said stylus is pressed against said flange to retract said stylus into said body, and said hole centering probe is inserted in said hole and said outer ends of said arms contact said flange surface to maintain said longitudinal axis of said body perpendicular to a line on said flange surface parallel to a surface in which said hole is drilled and which is contacted by said stylus contact point, so the reading on said linear measuring gauge is an accurate measure of the distance from the axis of said hole to said flange at the height of said contact point of said stylus.

12. A measuring instrument as defined in claim 11, wherein:
   said coupling means includes gear teeth at said inner ends of each arm operatively coupled to each other to maintain equal the angle both arms make with said longitudinal axis of said instrument.

13. A measuring instrument as defined in claim 11, wherein:
   said hole center probe includes a conical plunger which is spring loaded in said body for self-centering in said hole and retracting into said body to permit said body to lie flat against said surface wherein said hole is drilled with said plunger completely filling said hole at said surface.

14. A measuring instrument as defined in claim 13, wherein:
   said slidable means includes an extension rod that passes through an elongated opening in said plunger.

15. A measuring instrument as defined in claim 14, further comprising:
   a cylindrical bearing sleeve surrounding and guiding said plunger;
   a hole in said bearing sleeve extending parallel to said longitudinal axis and in which said extension rod is slidably mounted for longitudinal motion, said hole registering with said elongated opening in said plunger.

16. A measuring instrument as defined in claim 13, wherein:
   said stylus includes an offset leaf connected to the forward end of said extension rod and having a forwardly projecting contact nubbin for contacting said flange at a predetermined height above said surface.

17. A measuring instrument as defined in claim 11, further comprising:
   a pin projecting from said bottom face of said instrument and connected to said linear measurement means for measuring the distance from said hole centering probe to an adjacent edge on a structure in which said hole is located.

18. A measuring instrument as defined in claim 17, wherein:
   said pin is connected to a slide mounted in said body for linear motion parallel to said longitudinal axis; and
   said slidable means includes means for operatively engaging said slide, whereby said linear measuring means is moved by said side and indicates the magnitude of said motion to measure the distance from the centerline of said hole to said edge.

19. A measuring instrument as defined in claim 18, wherein:
   said slide is mounted on linear bearings for precise guidance in a direction parallel to said longitudinal axis.

20. A measuring instrument as defined in claim 19, further comprising:
   a pocket in said body for receiving said linear measurement means and said slidable means;
   said pocket includes a shoulder machined therein precisely parallel to said longitudinal axis to provide a means for precisely locating the orientation of said linear bearings in said pocket.

21. A method for measuring the distance from the centerline of a hole in a surface of one structural member to an adjacent flange, comprising:
   positioning an instrument, having a longitudinal axis defining a front end and a rear end, with said front end thereof facing said flange;
   pressing a spring loaded stylus contact point, protruding from said front end of said instrument, against said flange to partially retract said stylus into said instrument;
   producing an electrical signal in an electrical measuring gauge connected to said stylus in said instrument indicative of the position of said stylus relative to a reference position;

inserting a conical, spring-loaded plunger, protruding from a bottom face of said instrument, into said hole;

pressing said instrument against said surface to fill said hole at said surface with said plunger and to center said plunger in said hole, and to seat said instrument against said surface;

pivoting two arms within said instrument an coupling said two arms together at inner ends thereof and to maintain the angle of each arm relative to said longitudinal axis equal to the angle of the other arm;

pressing an outer end of each of said two arms, projecting laterally from said instrument, against said flange to ensure that said longitudinal axis of said instrument is at a right angle to said flange when said measurement is taken;

reading said gauge to ascertain said distance from said flange to said centerline of said hole.

22. The method defined in claim 21, further comprising:

off-setting the point of contact of said stylus from a rod to which said stylus is connected to position the point of contact of said stylus at a preselected distance above said surface.

23. The method defined in claim 21, further comprising:

urging said arms to rotate about their pivot points to press said outer end of said arms forward against said flange.

24. The method defined in claim 21, further comprising:

guiding said stylus for straight line motion parallel to said longitudinal axis, whereby the position of said stylus, as sensed by said measuring gauge, accurately represents the perpendicular distance from said flange to said centerline of said hole.

25. The method defined in claim 24, wherein:

said stylus guiding step includes mounting said stylus on a straight bar, and guiding said straight bar in linear bearings for straight linear motion parallel to said longitudinal axis.

26. The method defined in claim 21, further comprising:

slidably guiding a pin, protruding from said bottom face of said instrument, in a direction parallel to said longitudinal axis;

abutting said pin against an edge of a flange on a second structural member to which said one structural member is to be attached by a fastener through said hole;

inserting said conical spring-loaded plunger into said hole in said second structural member to establish a reference position against which the position of said pin can be measured to determine the distance from said edge of said second structural member to said hole centerline; and reading said edge-to-centerline-of-hole distance on said measuring gauge.

27. The method defined in claim 26, further comprising:

plugging a data recorder into said instrument; and recording the readings of said measuring gauge on said data recorder for purposes of statistical process control.

28. The method defined in claim 26, wherein said pin guiding step comprises:

attaching said pin to a plate;

slidably guiding said plate in said instrument by attaching a rail to one of said plate and a pocket in said instrument in which said plate is mounted, and attaching a set of linear bearings to the other of said plate and said pocket in a position to guide said plate for precise linear motion parallel to said longitudinal axis.

29. The method defined in claim 28, further comprising:

exerting a spring force with a rod spring on a rod, which is connected to an LVDT as part of said measuring gauge in said instrument, toward said front end of said instrument; and pressing said rod against said plate so that said rod spring urges said rod and said plate toward said front end of said instrument.

30. The method defined in claim 28, further comprising:

pulling back a handle on said plate to permit said instrument to be laid flat on said second structural member with said conical plunger in said hole; and allowing said plate to slide forward under the influence of said rod spring until said pin engages said edge of said second structural member.

* * * * *